US012743955B2

(12) United States Patent
Chen et al.

(10) Patent No.: US 12,743,955 B2
(45) Date of Patent: Sep. 22, 2026

(54) SAFETY-DEPENDENT VEHICLE-TO-EVERYTHING (V2X) TRANSMISSION

(71) Applicant: QUALCOMM Incorporated, San Diego, CA (US)

(72) Inventors: Cong Chen, San Diego, CA (US); Jonathan Petit, Wenham, MA (US); William Whyte, Natick, MA (US); Abolfazl Hajisami, Escondido, CA (US); Jean-Philippe Monteuuis, Northborough, MA (US); Mohammad Raashid Ansari, Saugus, MA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 18/608,634

(22) Filed: Mar. 18, 2024

(65) Prior Publication Data

US 2025/0292683 A1 Sep. 18, 2025

(51) Int. Cl.
*G08G 1/16* (2006.01)
*H04W 4/46* (2018.01)

(52) U.S. Cl.
CPC ............. *G08G 1/164* (2013.01); *G08G 1/166* (2013.01); *H04W 4/46* (2018.02)

(58) Field of Classification Search
CPC .......... G08G 1/164; G08G 1/166; H04W 4/46
See application file for complete search history.

(56) References Cited

U.S. PATENT DOCUMENTS 11,488,480 B1 * 11/2022 Balasubramanian ... H04W 4/90
2023/0251342 A1 * 8/2023 Zhu ..................... H04W 64/006 455/456.1

OTHER PUBLICATIONS

Dayal A., et al., "Adaptive Semi-Persistent Scheduling for Enhanced On-road Safety in Decentralized V2X Networks", ARXIV.2104.01804v1, Cornell University Library, 201 Olin Library Cornell University Ithaca, NY 14853, Apr. 5, 2021, 9 Pages, XP081932323, abstract Introduction (Section I) section III (C-V2X Mode-4, pp. 4-6) Section V (Adaptive SPS++ Scheduling Protocol, pp. 7-11) figures 3,4 Performance Evaluation (Section VI, pp. 11-14).
International Search Report and Written Opinion—PCT/US2025/015992—ISA/EPO—May 16, 2025.

* cited by examiner

*Primary Examiner* — Andrew J Cromer
(74) *Attorney, Agent, or Firm* — Thien T. Nguyen

(57) ABSTRACT

A user equipment (UE) for vehicle-to-everything (V2X) transmission is provided. The UE includes: at least one transceiver; at least one memory; and at least one processor, coupled with the at least one transceiver and the at least one memory, the at least one processor configured to: detect a second position of a second UE with respect to a first position of the UE; generate an alert time window based on the first position of the UE and the second position of the second UE; and schedule at least one transmission from the UE to the second UE based on the alert time window.

20 Claims, 10 Drawing Sheets

SAFETY-DEPENDENT VEHICLE-TO-EVERYTHING (V2X) TRANSMISSION

BACKGROUND

At present, wireless vehicular communication systems are desirable for achieving higher levels of automated driving for certain vehicles utilizing wireless access technology known as vehicle-to-everything (also known as V2X) communication technology or direct access technology (known as DSRC (Dedicated Short-Range Communication)). In general, V2X technology involves high-bandwidth and low-latency communications that utilize sensors, cameras, and wireless connectivity, and allow vehicles to share real-time information with their drivers, other vehicles, pedestrians and roadway infrastructure like traffic lights. It is often desirable to be able to determine the location of one or more target vehicles relative to a source vehicle. In general, a source vehicle is configured to determine the location of the target vehicles by transmitting and receiving periodic messages to the target vehicles.

As an example, currently V2X systems periodically broadcast Basic Safety Messages (BSM) or Cooperative Awareness Messages (CAM) at a sufficient high rate to have a sufficiently high probability of “on time” reception by the neighboring target vehicles. However, this is not an efficient utilization of the wireless spectrum.

SUMMARY

Techniques are discussed for a system and method for safety-dependent vehicle-to-everything (V2X) transmission by a user equipment (UE). The UE has a first position and comprises: at least one transceiver; at least one memory; and at least one processor, in signal communication with the at least one transceiver, and the at least one memory, the at least one processor configured to: detect a second position of a second UE with respect to the first position of the UE; generate an alert time window from the first position of the UE and the second position of the second UE; and schedule at least one transmission from the UE to the second UE based on the alert time window.

Also discussed is a method for safety-dependent V2X transmission by a first UE having a first position. The method comprises: detecting, with the first UE, a second position of a second UE with respect to the first position of the first UE; generating an alert time window based on the first position of the first UE and the second position of the second UE; and scheduling at least one transmission from the first UE to the second UE based on the alert time window.

Also discusses is a UE comprising: means for detecting a second position of a second UE with respect to the first position of the UE; means for generating an alert time window based on the first position of the UE and the second position of the second UE; and means for scheduling at least one transmission from the UE to the second UE based on the alert time window.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION

Figure 1:
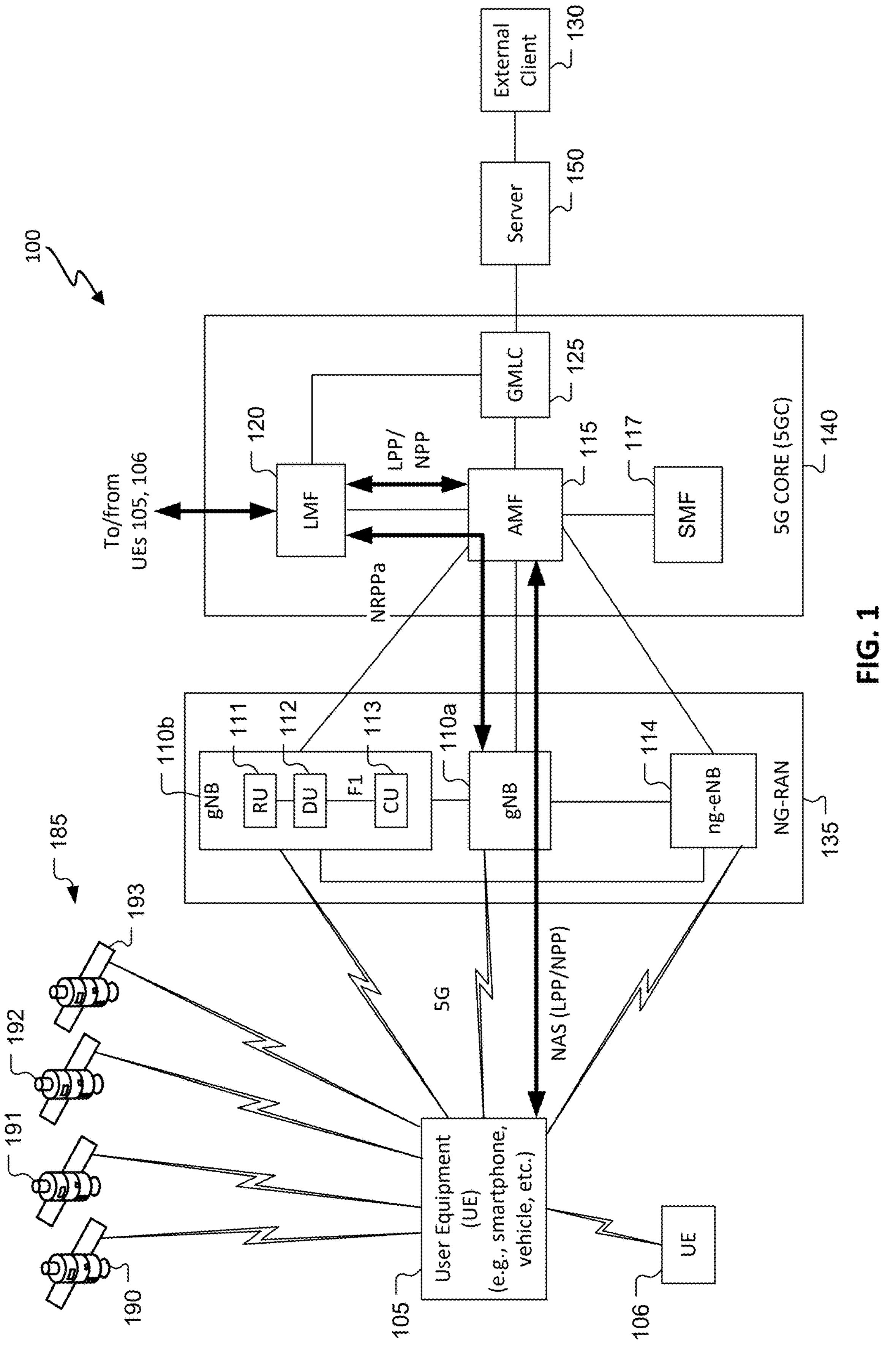
FIG. 1 is a simplified diagram of an example wireless communications system.

Techniques are discussed for a system and method for safety-dependent vehicle-to-everything (V2X) transmission by a user equipment (UE). In general, these techniques optimize V2X transmission to improve spectrum efficiency. As an example, these techniques include the following aspects, features, or both: a discovery phase where a transmitting UE needs to know where any neighboring UEs are in order to adjust the transmission schedule of the transmitting UE, where the discovery may be based on various types of information that are indicative of where the neighboring UEs are located; a useful alert time window determination phase based on the locations of the neighboring UEs, where the transmitting UE may determine which receiving UEs (of the neighboring UEs) would benefit the most from messages from the transmitting UE and this determination may be based on various factors including the applications for which the messages may be relevant/useful and/or a risk of collision (RoC), etc.; and a scheduling and transmission phase where the transmitting UE then determines/adjusts its transmission schedule to maximize probability of reception by receiving UEs within the useful alert time window for a maximum number of “applications” or usage of the messages transmitted by the transmitting UE.

As an example, these techniques may include a method for safety-dependent V2X transmission by a first UE having a first position where the method includes: detecting, with the first UE, a second position of a second UE with respect to the first position of the first UE; generating an alert time window from the first position of the first UE and the second position of the second UE; and scheduling at least one transmission from the first UE to the second UE based on the alert time window.

Utilizing these techniques, the V2X transmissions of the transmitting UE may be tailored to be received within a "useful alert" time window by the receiving UEs. As such, receiving UEs receive the information from the transmitting UE not too early or too late to be useful to consuming applications of the receiving UEs. In general, these techniques include: techniques to determine a useful alert time window for each V2X application within a neighboring/target UE; adjustment of the transmission schedule of the transmitting UE; and coordination of the transmission for concurrent applications.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT)

device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such implementations, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some implementations, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other examples, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some examples, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
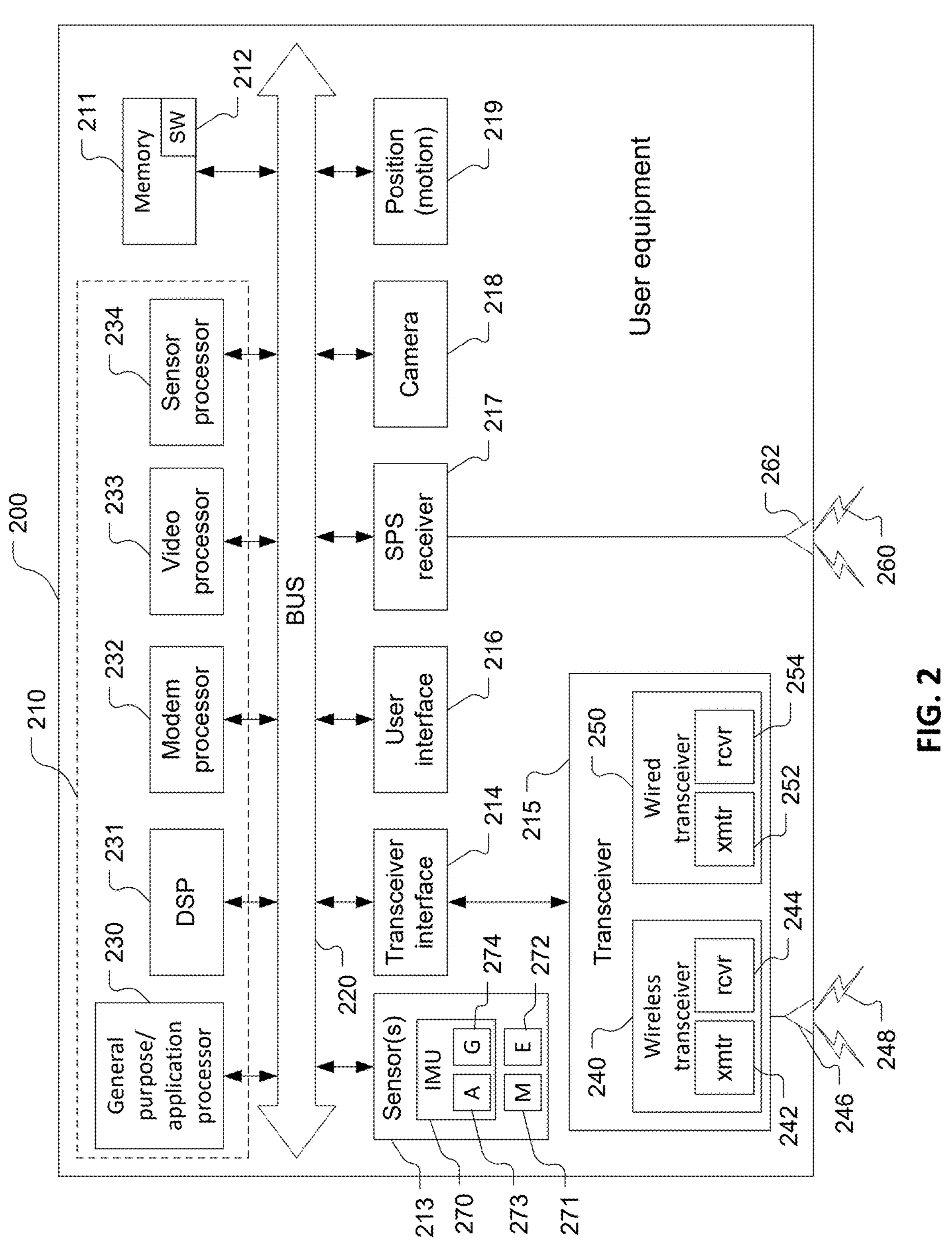
FIG. 2 is a system block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a GPS receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
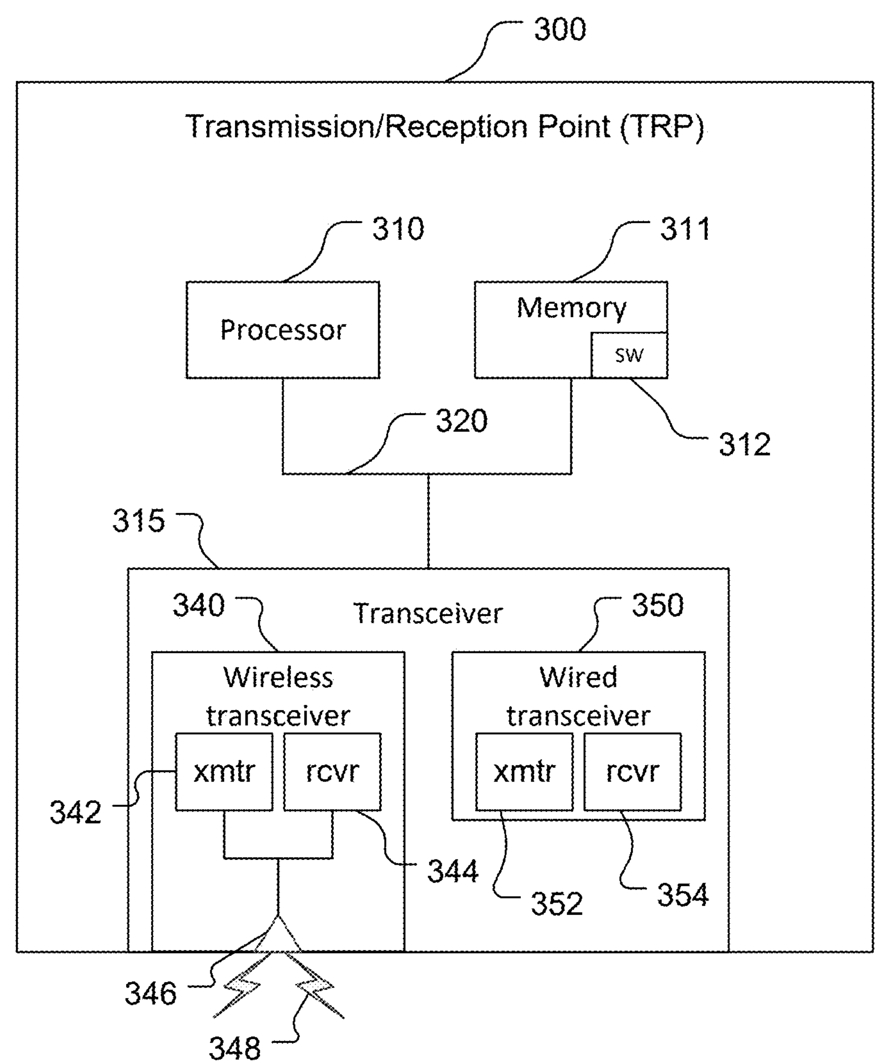
FIG. 3 is a system block diagram of components of an example transmission/reception point shown in FIG. 1.

Referring also to FIG. 3, an example of a TRP 300 of the gNBs 110*a*, 110*b* and/or the ng-eNB 114 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
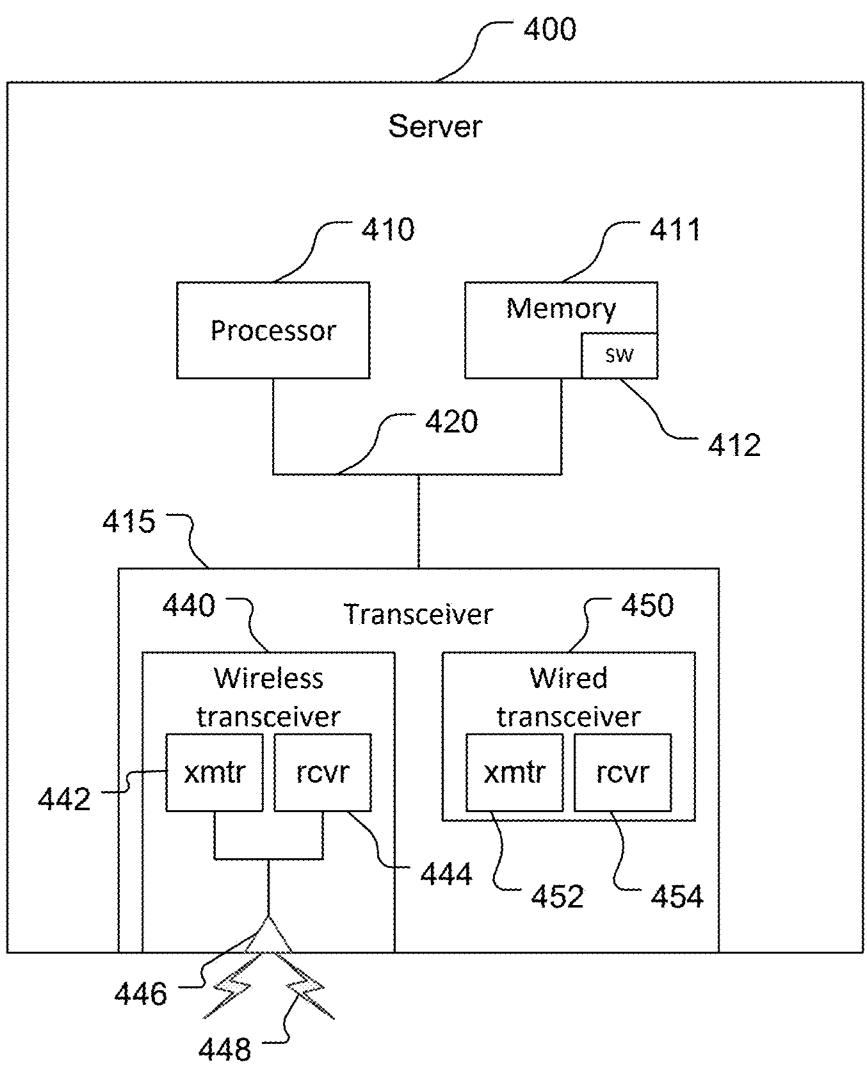
FIG. 4 is a system block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T\_(Rx \rightarrow Tx)$ (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference $T\_(Tx \rightarrow Rx)$ between the transmission time of the RTT measurement signal from the base station and the ToA of the RTT response at the base station to the UE-reported time difference $T\_(Rx \rightarrow Tx)$, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal.

The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
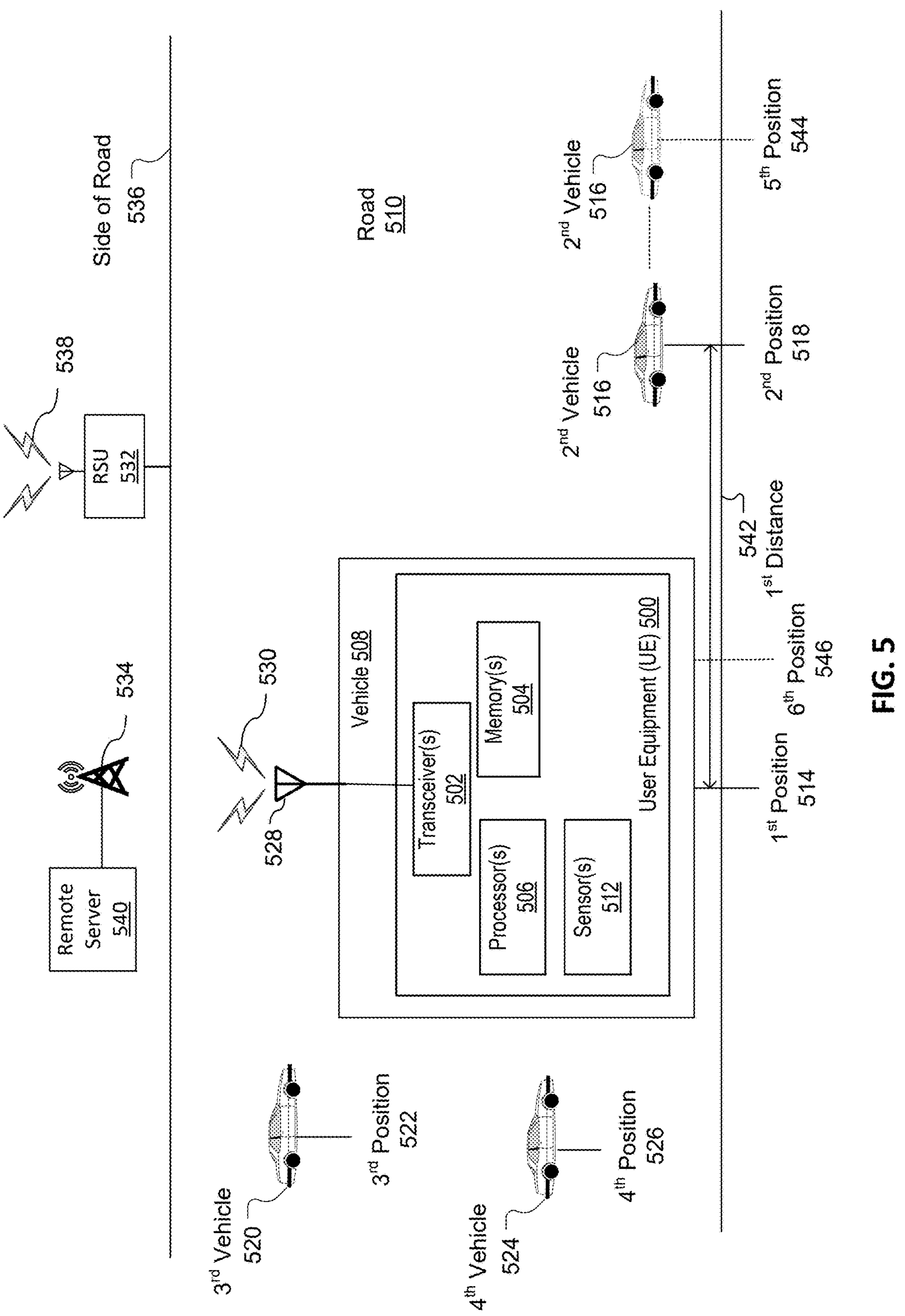
FIG. 5 is a functional system block diagram of an example of an implementation of a User Equipment (UE) for safety-dependent V2X transmission in accordance with the present disclosure.

In FIG. 5, a functional system block diagram is shown of an example of an implementation of a UE 500 for safety-dependent V2X transmission in accordance with the present disclosure. The UE 500 includes at least one transceiver 502, at least one memory 504; and at least one processor 506, in signal communication with the at least one transceiver 502, and the at least one memory 504. In this example, the UE 500 may be integrated into, or part of, a vehicle 508 that may be an autonomous or semi-autonomous vehicle that is configured to travel along a road 510. The UE 500 may include at least one sensor 512 configured for detecting the environment surrounding the UE 500 and vehicle 508. In this example, the at least one sensor 512 may be, for example, a camera, a radar, a light detection and ranging (Lidar) device, an acoustic sensor, or other types of sensor.

In this example, the vehicle 508 is shown as being located at a first position 514 along the road 510 and vehicle 508 is shown as being located between a plurality of neighboring vehicles along the road 510 that include, for example, a second vehicle 516 (also interchangeably referred to as a second UE located within the second vehicle 516) at a second position 518, a third vehicle 520 at a third position 522, and a fourth vehicle 524 at a fourth position 526.

As an example, the at least one processor 506 is configured to: detect the second position 518 of a second UE (of a second vehicle 516) with respect to the first position 514 of the UE 500 (which may be referred to interchangeably as a first UE); generate an alert time window (ATW) from the first position 514 of the UE 500 and the second position 518 of the second UE; and schedule at least one transmission from the UE 500 to the second UE based on the ATW. In this example, the at least one transceiver 502 is in signal communication with at least one antenna 528 that is configured to transmit and receive one or more signals 530.

In this example, the environment along the road 510 may include wireless devices configured to communicate with the plurality of vehicles 508, 516, 520, and 524. These example wireless devices may include, for example, a roadside unit (RSU) 532 and/or a wireless base station 534. In this example, the RSU 532 may be a wireless communication device located on the side 536 of the road 510 that is configured to provide connectivity and information to the passing the plurality of vehicles 508, 516, 520, and 524.

The RSU 532 may include one or more sensors that include, for example, a camera, a radar, a Lidar device, an acoustic sensor, or other types of sensors. The RSU 532 may transmit a plurality of signal 538 related to, for example, the acquired sensor data of the environment surrounding the road 50 that includes the plurality of vehicles 508, 516, 520, and 524, safety warnings, traffic information, etc.

The wireless base station 534 may be a base station of a wireless communication network having a remote server 540 (also interchangeably referred to as a network entity). The wireless base station 534 may be in signal communication with the plurality of vehicles 508, 516, 520, and 524 providing both communications and positional assistance data. In this example, the wireless base station 534 may be the NG-RAN 135, gNB 110*a*, and/or TRP 300 and the remote server may be the server 400 described previously.

In this example, the first UE 500, second UE within the second vehicle 516, third UE within the third vehicle 520, and fourth UE within the fourth vehicle 524 may communicate with each other utilizing V2X transmissions for sidelink (SL) positioning utilizing V2X signaling and protocols. As an example, the first UE 500 and second UE in the second vehicle 516 may communicate with each other through UE-to-UE SL communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as SL communications without limiting the communications to a particular protocol. Alternatively, the first UE 500, second UE within the second vehicle 516, third UE within the third vehicle 520, and fourth UE within the fourth vehicle 524 may communicate with each other utilizing V2X transmissions over the communication network of the wireless base station 534 and remote server 540, or a combination of the wireless base station 534 and RSU 532.

The circuits, components, modules, and/or devices of, or associated with, the first UE 500 and other devices are described as being in signal communication, communicatively coupled, and/or electrically coupled (or simply "coupled") with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information may be passed from one circuit, component, module, and/or device to another in varying digital formats without passing through a direct electromagnetic connection.

In this disclosure, techniques are discussed for a system and method for safety-dependent V2X transmission by the UE 500. In general, these techniques optimize V2X transmission to improve spectrum efficiency. As an example, these techniques include the following aspects, features, or both: a discovery phase where the UE 500 (acting as a transmitting UE) needs to know where any neighboring UEs (i.e., the UEs in the plurality of vehicles 516, 520, and 524) are in order to adjust the transmission schedule of the UE 500, where the discovery may be based on various types of information that are indicative of where the plurality of vehicles 516, 520, and 524 are located; a useful ATW determination phase based on the locations of the plurality of vehicles 516, 520, and 524, where the UE 500 may determine which receiving UEs (of the neighboring UEs within the vehicles 516, 520, and 524) would benefit the most from messages from the UE 500 and this determination may be based on various factors including the applications for which the messages may be relevant/useful and/or a risk of collision (RoC), etc.; and a scheduling and transmission phase where the UE 500 then determines/adjusts its transmission schedule to maximize a probability of reception by receiving UEs (of vehicles 516, 520, and 524) within the useful ATW for a maximum number of "applications" or usage of the messages transmitted by the UE 500.

Utilizing these techniques, the V2X transmissions of the UE 500 may be tailored to be received within a "useful alert" time window by the receiving UEs of vehicles 516, 520, and 524. As such, the receiving UEs of vehicles 516, 520, and 524 receive the information from the UE 500 not too early or too late to be useful to consuming applications of the receiving UEs. In general, these techniques include: techniques to determine a useful ATW for each V2X application within a neighboring/target/receiving UE of vehicles 516, 520, and 524; adjustment of the transmission schedule of the UE 500; and coordination of the transmission for concurrent applications.

As an example, the second vehicle 516 is located the second position 518 that is located a first distance 542 away from the first position 514 of the UE 500. In this example, the at least one processor 506 of the UE 500 may be configured to detect the second position 518 of the second UE of second vehicle 516 with respect to the first position 514 of the UE 500 and generate an ATW from the first position 514 of the UE 500 and the second position 518 of the second UE. The ATW is then based on the resulting first distance 542 between the UE 500 and the second UE of the second vehicle 516. The at least one processor 506 of the UE 500 is then configured to schedule at least one transmission from the UE 500 to the second UE of the second vehicle 516 based on the ATW for spectrum efficiency. Once scheduled, the at least one processor is further configured to transmit to the second UE a Basic Safety Message (BSM) or a Cooperative Awareness Message (CAM) at a baseline frequency that may be configurable.

In this example, the BSM transmitted by the UE 500 contains data about the position (i.e., the first position 514), speed, heading, and acceleration of the vehicle 508. Similarly, the CAM transmitted by the UE 500 is a safety related message with information about vehicle 508 state, such as, for example, the position (i.e., the first position 514), direction, and/or velocity of the vehicle 508. The UE 500 may be configured to receive the second position 518 of the second UE of the second vehicle 516 from at least one RSU (i.e., RSU 532), sensing the second position 518 of the second UE with the at least one sensor 512, or both.

In this example, the at least one processor 506 may be configured to generate the ATW by being configured to determine a RoC between the UE 500 and the second UE of the second vehicle 516. The at least one processor 506 may also be configured to schedule the at least one transmission by being configured to establish a transmission schedule to maximize a probability of reception of the second UE, within the second vehicle 516, within the ATW. Further, the at least one processor 506 may also be configured to schedule the at least one transmission by being configured to establish a transmission schedule to maximize a number of applications on the second UE of the second vehicle 516. Moreover, the at least one processor may also be configured to first detect the second position 518 of the second UE of the second vehicle 516 by being configured to track the second UE and update the second position 518 of the second UE to a third position (i.e., a fifth position 544) of the second UE based on tracking the second UE; and then generate an ATW by being configured to determine a RoC based on the first position 514 of the UE 500 and the third position of the second UE of the second vehicle 516. In this example, the at least one processor may be further configured to receive kinematic data, via the at least one sensor 512, for the UE 500, and update the first position 514 of the UE 500 to a fourth position (i.e., a sixth position 546 of the vehicle 508) of the UE 500 based on the kinematic data produced by the at least one sensor 512. In this example, the at least one processor 506 is configured to generate the ATW by further being configured to update the RoC based on the fourth position (i.e., sixth position 546) of the UE 500 and the third position (i.e., the fifth position 544) of the second UE of the second vehicle 516.

In these examples, the at least one processor 506 may be configured to schedule at least one transmission by being configured to determine if the BSM, CAM, or both are scheduled to be transmitted, and reschedule a new transmission from the UE 500 to the second UE of the second vehicle 516 based the RoC. In this way, the at least one processor 506 is configured to transmit the BSM, CAM, or both to the second UE if the RoC is higher than a predetermined threshold when the first distance 542 between the UE 500 and second vehicle 516 is within a useful alert (UA) time segment of the ATW.

As such, utilizing these techniques, the UE 500 is configured to perform a discovery phase, useful ATW determination, and schedule determination and transmission. As discussed previously, in the discovery phase, the UE 500 detects/determines where the neighboring UEs are in order to adjust its transmission schedule. A first example of determining the positions of the neighboring UEs is to receive the BSM/CAM transmissions from each of the neighboring UEs at baseline frequency such as, for example, 1 Hz. In this example, the baseline BSM transmission frequency may be configurable. Another example of determining the positions of the neighboring UEs for the UE 500 to detect the presence of the neighboring UEs via perception systems associated with the at least one sensor 512 (i.e., camera, radar, Lidar, etc.) or by receiving broadcast locations of the plurality of vehicles 516, 520, and 524 from the RSU 532. The UE 500 may then determine the useful ATW based on where the neighboring UEs are and the UE 500 may determine which of the neighboring UEs would benefit the most from the UE 500 transmitting a message indicating its location (i.e., at first position 514 or sixth position 546). This determination may be based on RoC between the UE 500 and the neighboring UE that would benefit the most from the UE 500 transmitting a message (e.g., the second vehicle 516). The determination may also be based on the location (i.e., at first position 514 or sixth position 546) of the UE 500 in an example where the UE 500 is following the second vehicle 516 even if the RoC is not high. The UE 500 may then determine and/or adjust its transmission schedule to maximize the probability of reception by second UE in the second vehicle 516 within the useful ATW and for a maximum number of "applications" of the second UE.

In this example, the ATW may be divided into, for example, three time segments that include an early alert (EA) time, the UA time, and a late alert (LA) time. In this example, the EA may be an alert or status report that is generated at the second vehicle 516 at a time that is too early to affect the probability of a collision because the probability of collision is low and will not be reduced. The UA may be an alert that is generated at the second vehicle 516 that is useful because the probability of collision is high with another vehicle (i.e., vehicle 508) and the UA reduces the probability of collision by causing the vehicle 508 and/or second vehicle 516 to modify their movement to avoid a collision. The LA is an alert generated at the second vehicle 516 that is too late to be useful because at the alert is at a point where a collision of the vehicle 508 and second vehicle 516 cannot be avoided.

Figure 6:
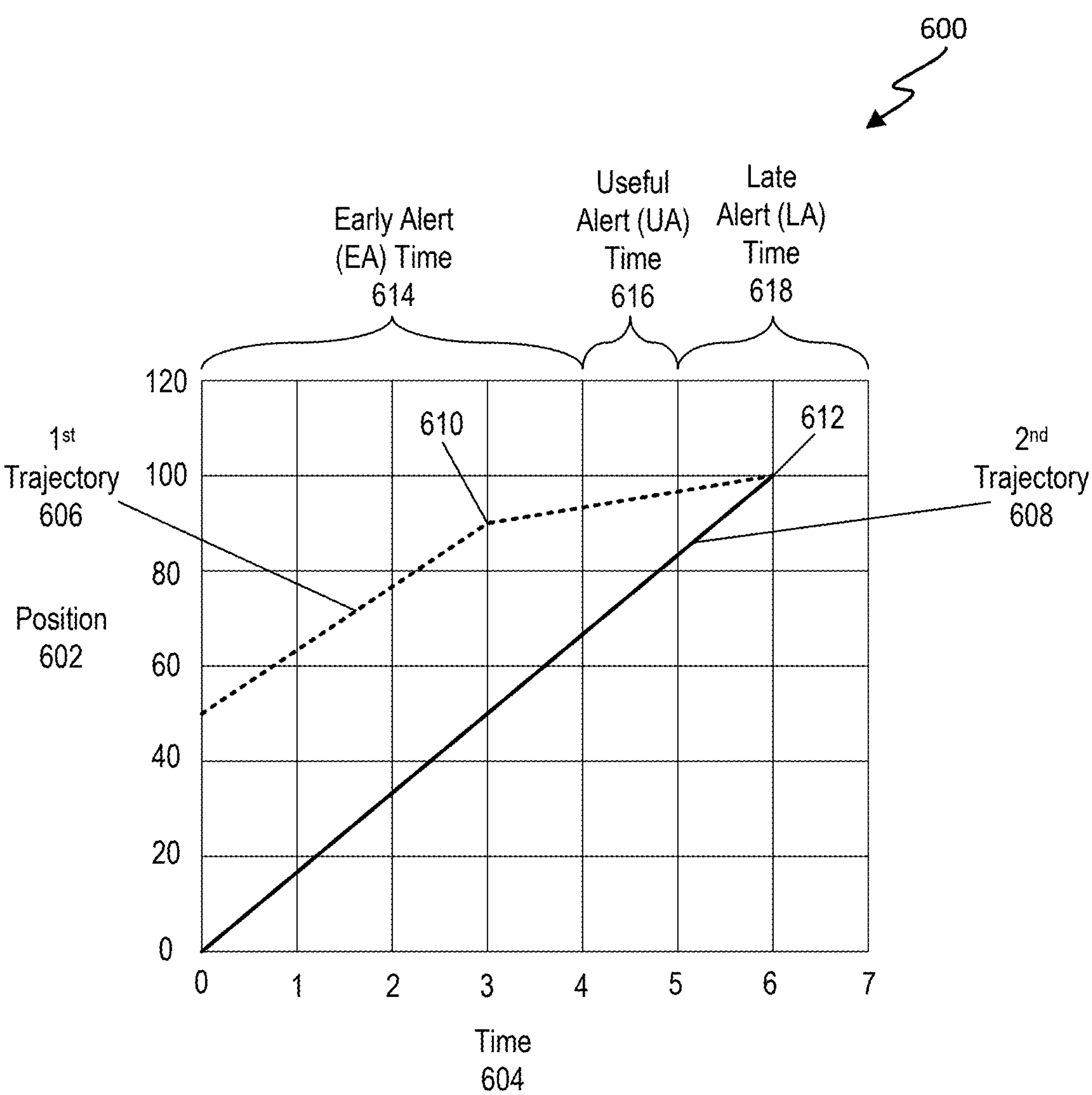
FIG. 6 is a plot of an example of trajectories of a first vehicle including the UE and a second vehicle along a route in accordance with the present disclosure.

Turning to FIG. 6, a plot 600 is shown of an example of trajectories of a first vehicle (i.e., the vehicle 508) and the second vehicle 516 along a route in accordance with the present disclosure. The plot 600 is of relative position 602 versus normalized time 604. In this example, the vehicle 508 is shown traveling along a first trajectory 606 and the second vehicle 516 is shown traveling along a second trajectory 608. In this example, both vehicles 508 and 516 may be traveling along the same direction where the vehicle 508 may be located in front of the second vehicle 516. As an example, at a first point 610, if the first vehicle 508 brakes hard along the first trajectory 606 at time 604 equals 3 and second vehicle 516 does not react, there will be a collision of the vehicle 508 and second vehicle 516 at a second point 612 at time 604 equals 6. Based on the first trajectory 606 and second trajectory 608, the time 604 may be segmented into the three time segments corresponding to a EA time 614, UA time 616, and LA time 618. In this example, the EA time 614 is not useful because it is too early to affect the probability of a collision at second point 612 between the vehicle 508 and second vehicle 516 because the probability of collision is low and will not be reduced. In contrast, the UA time 616 is useful because the probability of collision between the vehicle 508 and second vehicle 516 is high at the second point 612 and there is enough time in the UA time 616 to modify the speed and/or direction of the vehicle 508, second vehicle 516, or both to avoid the collision at the second point 612. As such, an alert to the second vehicle 516 within the UA time 616 reduces the probability of collision by causing the vehicle 508 and/or second vehicle 516 to modify their movement to avoid the collision. At the LA time 618, an alert generated within the LA time 618 is too late to avoid a collision at the second point 612 and is thus not a useful alert because the collision of the vehicle 508 and second vehicle 516 cannot be avoided within the LA time 618. Therefore, V2X messages (e.g., CAM/BSM) transmitted by the UE 500 of the vehicle 508 and received by the second UE of the second vehicle 516 are most useful within the UA time 616.

In this example, at present, known V2X systems transmit messages based on the state of the transmitting UE and channel congestion. As such, these messages are transmitted during throughout the EA time 614, UA time 616, and LA time 618 because they are sent frequently but these transmitted messages are not targeted for transmission to optimize transmission of the messages at the UA time 616.

In this disclosure, the transmitting UE (e.g., UE 500) chooses its transmission time to favor sending messages during UA time 618 interval. As described previously, the transmitting UE determines its transmission time by tracking nearby vehicles (e.g., the second vehicle 516, third vehicle 520, and fourth vehicle 524) and identifying if any of the nearby vehicles are at RoC. If a nearby vehicle is at RoC, the transmitting UE then utilizes standard dynamic techniques to identify a useful ATW for that selected vehicle. Identifying the useful ATW for the selected vehicle includes determining an EA time 614, UA time 616, and LA time 618 for the trajectory of the selected vehicle. The transmitting UE then transmits the safety message during the UA time 616 and possibly the LA time 618. In general, the transmitting UE will transmit the safety message during the UA time 616 but under certain circumstances, it may also transmit safety messages during the LA time 618 to attempt to minimize damage caused by the eventual collision of the transmitting UE and selected vehicle.

In these examples, there typically will be one receiving vehicle at greatest risk and the UA time period for that selected vehicle can be used to avoid a RoC with that selected vehicle but these techniques may be extended to cover multiple receiving vehicles so as to avoid an RoC between the transmitting UE and more than one receiving vehicles.

In these examples, the transmitting UE determines the UA time 616 based on the one or more applications of the receiving UE of the receiving vehicle and relevant conditions and/or factors of the environment around the transmitting UE and receiving vehicle. Examples of these applications may include (with respect to the location of the transmitting UE) a Forward Collision Warning (FCW) or Emergency Electronic Brake Light (EEBL) application when the receiving vehicle is located right behind the transmitting UE. As another example, when a receiving vehicle is located at an upcoming intersection and the transmitting UE approaches this intersection (i.e., within a configurable distance to the location of a deemed relevant zone), an Intersection Movement Assist (IMA) application of the receiving vehicle would consider the information from transmitting UE relevant and useful. As an example of a relevant conditions and/or factors of the environment around the transmitting UE, there may be a RoC because the transmitting UE in the transmitting vehicle may have a conflicting trajectory with the trajectory of the receiving vehicle.

Figure 7:
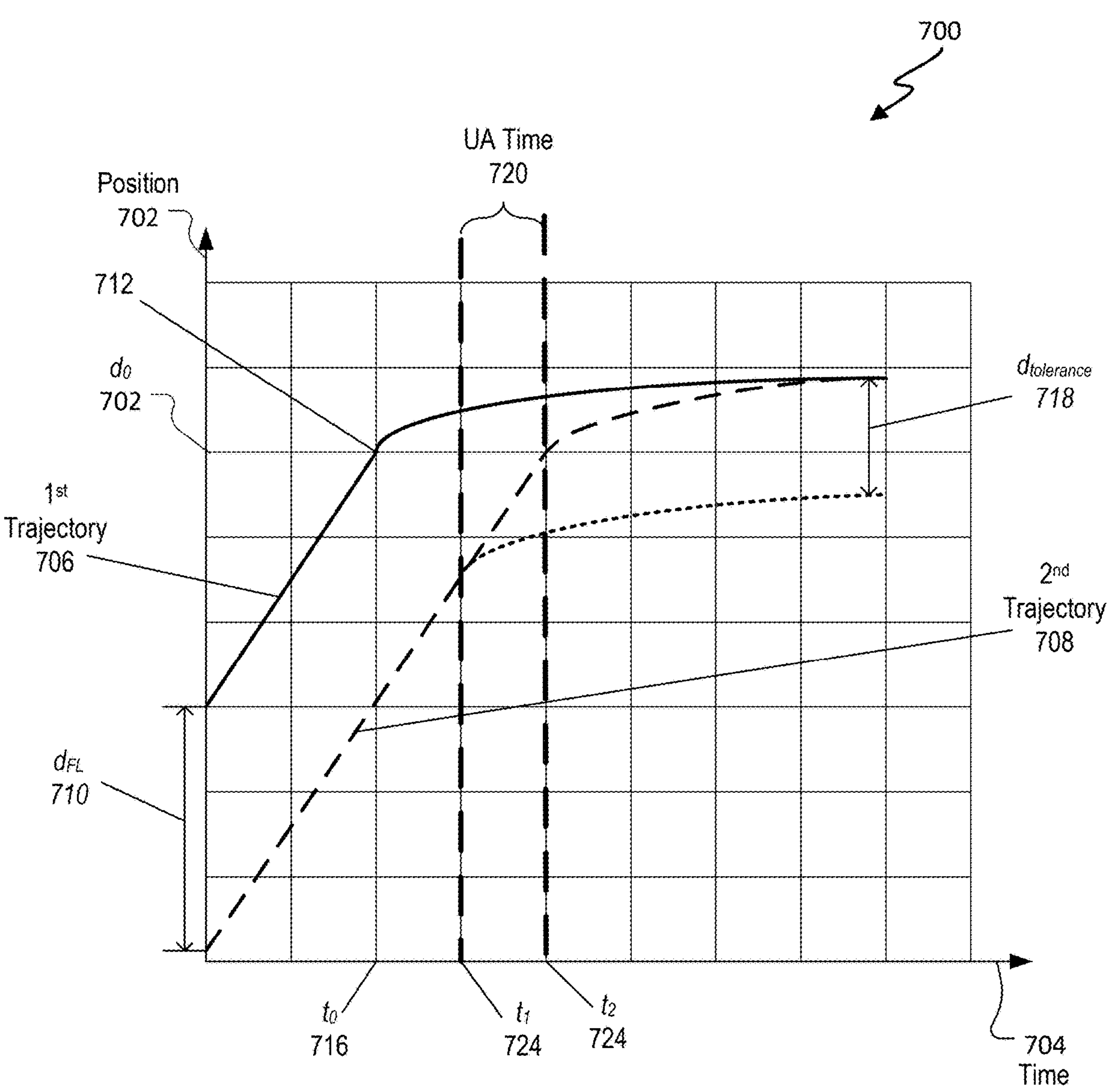
FIG. 7 is a plot of an example of an implementation of a technique for determining a useful alert time window of the first vehicle and the second vehicle, shown in FIG. 6, along the route in accordance with the present disclosure.

In FIG. 7, a plot 700 is shown of an example of an implementation of technique for determining a useful ATW a first vehicle (i.e., the vehicle 508) and the second vehicle 516 along the route in accordance with the present disclosure. The plot 700 is of relative position 702 versus normalized time 704. This example utilizes an EEBL application. In this example, for simplicity of illustration, the vehicle 508 and second vehicle 516 are shown as two vehicles traveling within the same lane of the road 510 and at the same speed where the vehicle 508 is a leading vehicle traveling along the first trajectory 706 and the second vehicle 516 is a following vehicle along the second trajectory 708. In this example, the vehicle 508 and the second vehicle 516 maintain a distance ($d_{FL}$) 710.

As an example, at a first point 712, if the first vehicle 508 brakes hard along the first trajectory 706 at a position 702 equal to a breaking distance (do) 714 and a time 704 equal to breaking time (to) 716, and second vehicle 516 does not react, there will be a collision of the vehicle 508 and second vehicle 516. When the second vehicle 516 stops due to an EEBL application based on either receiving a transmission from the vehicle 508 or from information received from its onboard sensors, it should stop within a tolerance region defined by a distance ($d_{tolerance}$) 718 from the vehicle 508.

In this example, the UA time 720 to avoid a RoC is defined as a time segment between a first time ($t_1$) 722 and second time ($t_2$) 724. In this example, $t_2$ 724 may be defined as $$t_2 = t_0 + \frac{d_{FL}}{V_F},$$

where $V_F$ represents the velocity of the vehicle 508 along the first trajectory 706 and $t_1$ 722 may be defined as $$t_1 = t_0 + \frac{d_{FL} - d_{tolerance}}{V_F}.$$

As an example, if the second vehicle 516 is a semiautonomous or driver assisted vehicle, there may be a time delay ($t_{delay}$) between the EEBL warning produced from the message received from the vehicle 508 within the UA time 720 and the brakes being applied to the second vehicle 516. The $t_{delay}$ may also be the result of transmission delays from the vehicle 508 to the second vehicle 516. If a $t_{delay}$ is present, the values of $t_1$ 722 and $t_2$ 724 may be updated as follows:

$$t_2 = t_0 + \frac{d_{FL}}{V_F} - t_{delay}$$

and $$t_1 = t_0 + \frac{d_{FL} - d_{tolerance}}{V_F} - t_{delay}.$$

In this example, the velocity $V_F$ is assumed to be constant for easily of description but $t_1$ 722 and $t_2$ 724 may also be adjusted if the vehicle 508, second vehicle 516, or both are accelerating by adjusting these relationship with the corresponding times that either the vehicle 508 or second vehicle 516 are accelerating relative to each other.

Figure 8:
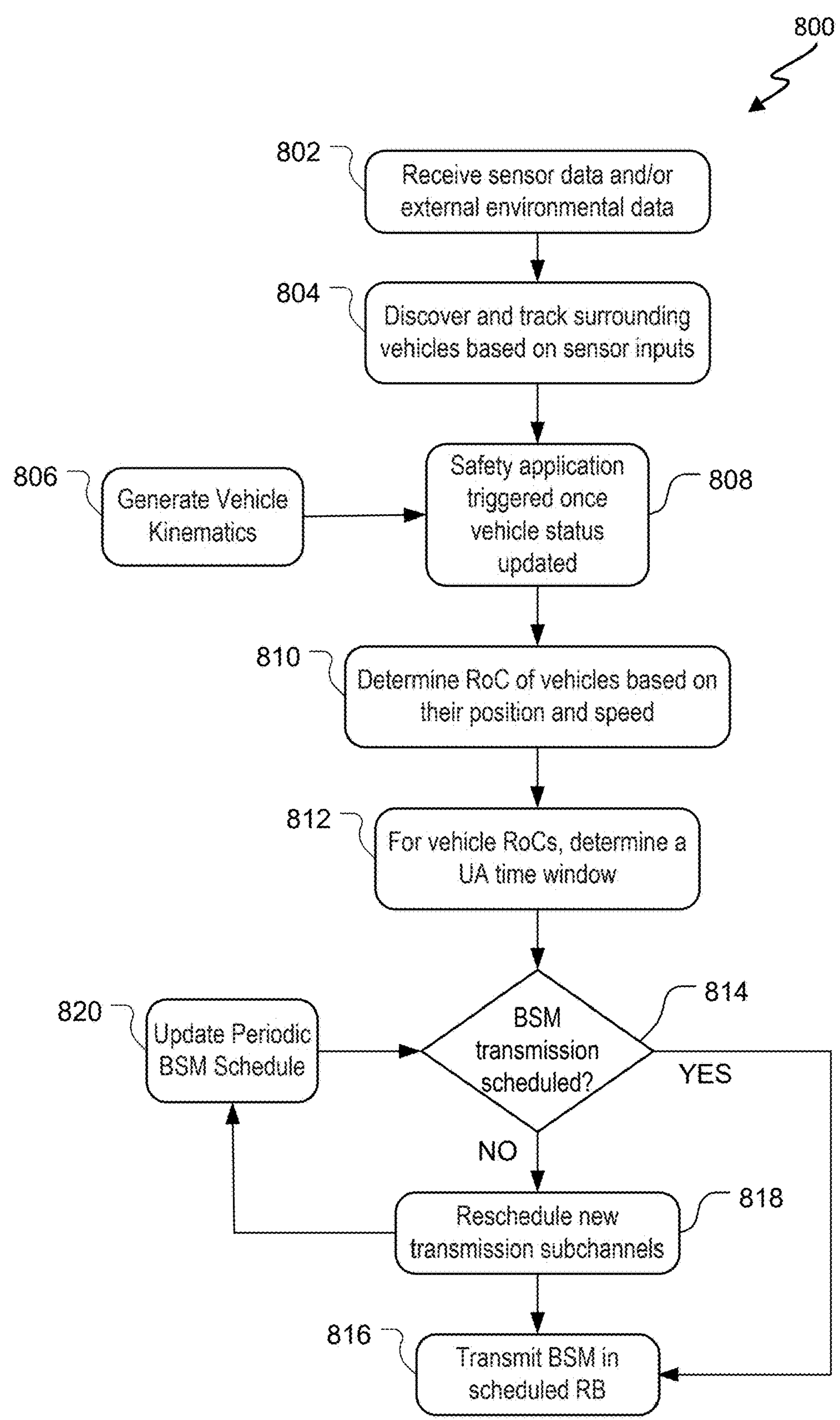
FIG. 8 is a flowchart of an example of an implementation of a process performed by the UE of FIG. 5 for safety-based transmission in accordance with the present disclosure.

Turning to FIG. 8, a flowchart is shown of an example of an implementation of a process 800 performed by the UE 500 for safety-based transmission in accordance with the present disclosure. In this example, the UE 500 receives 802 sensor data and/or external environmental data surrounding the UE 500. In this example, the sensor data is obtained from the at least one sensor 512 and may include perception (i.e., image and/or video) data from a camera, radar data, Lidar data, acoustic data, etc. The external environmental data may be V2X data such as BSM/CAM data from other neighboring vehicles, vehicle-to-vehicle (V2V) data from SL or other inter-vehicular applications, telematics, and communications, vehicle-to infrastructure (V2I) communications for devices such as RSUs, and invisible-to-visible (I2V) data that utilizes augmented reality interfaces that merge the real-world and virtual-world to make information data visible to a driver of semi-autonomous vehicle which the driver would not otherwise see. The UE 500 utilizes this information to discover and track 804 surrounding neighboring vehicles based on the sensor input and/or external environmental data. The UE 500 also senses the movement of the vehicle 508 to generate 806 vehicle kinematic data that is applied to a safety application trigger 808 once the vehicle status is updated.

In this example, the safety application trigger 808 may be a trigger that determines if an alert should be raised regarding the safety application. For example, Forward Collision Warning triggers when a following vehicle is too fast and may collide with the leading vehicle and the trigger should issue a warning that should be presented to driver of the following vehicle. The UE 500 then determines 810 the RoC of neighboring vehicles based on their respective positions, speeds/velocities, and headings. The UE 500 then determines 812 a UA time window for each vehicle RoC and determines 814 whether the next safety transmission (either BSM or CAM) is scheduled within the determined UA time. If the next safety transmission is scheduled within the determined UA time, the UE 500 transmits 816 the BSM or CAM in the scheduled Resource Block (RB). If, instead, the next safety transmission is not scheduled within the determined UA time, the UE 500 reschedules 818 new subchannels (or one-shot) (i.e., a one time-frequency block that is utilized to transmit a message) that fall within the UA time for the next transmission. The UE 500 then 500 transmits 816 the BSM or CAM in the scheduled Resource Block (RB) and updates 820 the periodic transmission schedule of BSM or CAM messages.

Figure 9:
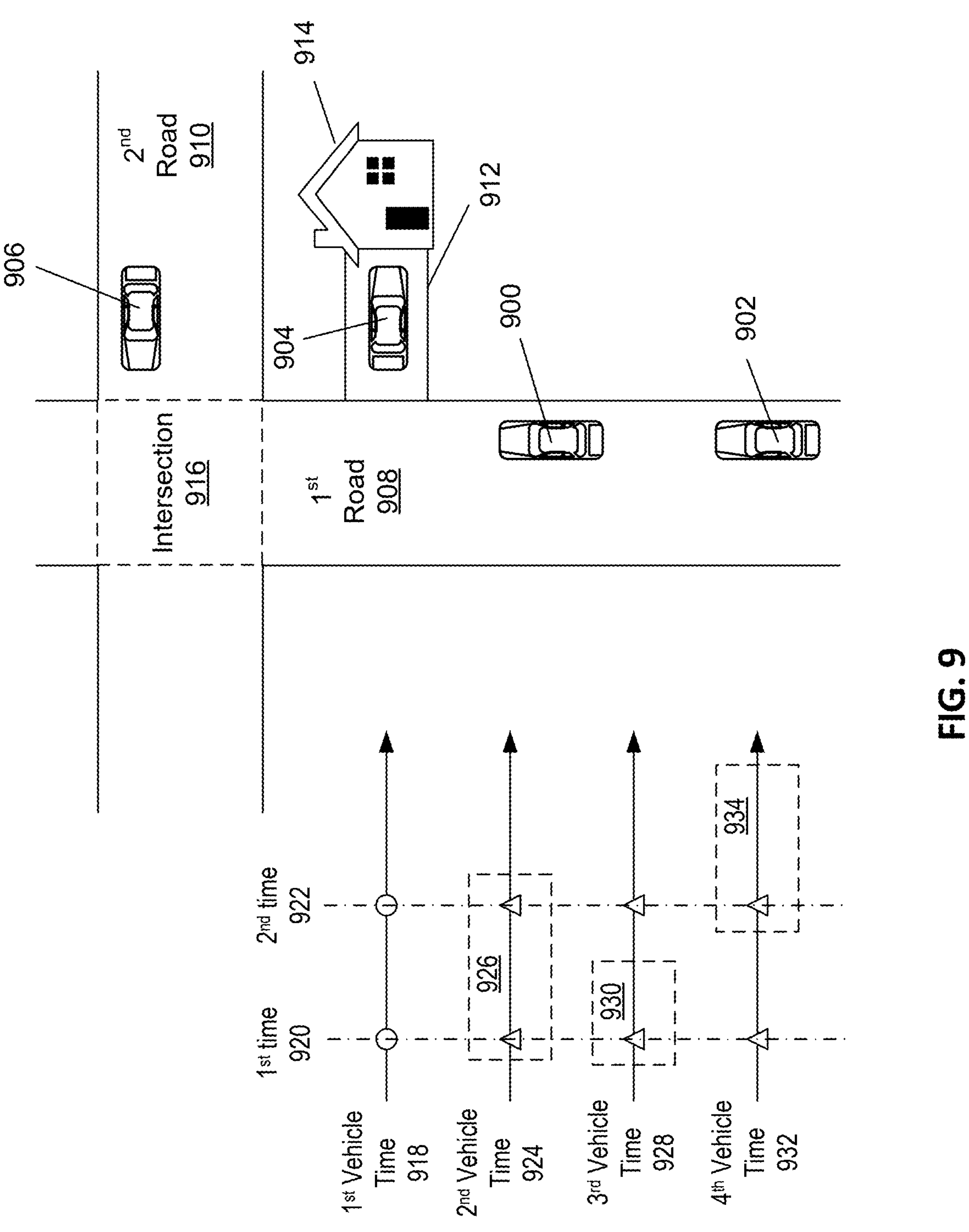
FIG. 9 is a functional diagram of an example of an implementation of multiple V2X applications where there are multiple receiving UEs with different Useful Alert times in accordance with the present disclosure.

In FIG. 9, a functional diagram is shown of an example of an implementation of multiple V2X applications where there are multiple receiving UEs with different UA times in accordance with the present disclosure. In this example, there four vehicles that include first vehicle 900, second vehicle 902, third vehicle 904, and fourth vehicle 906. The first vehicle 900 and second vehicle 902 are located on a first road 908, the fourth vehicle 906 is located on a second road 910, and the third vehicle 904 is located on a driveway 912 or home 914 off of the first road 908. The first road 908 and second road 910 meet at an intersection 916 close to the home 914. In this example, the first vehicle 900 is a leading vehicle and the second vehicle 902 is a following vehicle that are both traveling along the first road 908 in the same direction towards the intersection 916. As an example, the first vehicle 900 includes the transmitting UE (e.g., UE 500), second vehicle 902 is a following vehicle that is in a EEBL relevant zone, the third vehicle 904 may be a vehicle exiting the driveway 912 on to the first road 908 that is in a FCW relevant zone, and the fourth vehicle 906 is traveling along the second road 910 towards the intersection 916 and is a IMA relevant zone.

In this example there are three (3) competing UA times from the point of view of the first vehicle 900. As an example, the time 918 of the first vehicle 900 is shown having a first time 920 and a second time 922 as the first vehicle 900 travels along the first road 908 towards the intersection 916. The time 924 of the second vehicle 902 is shown having the first time 920 and second time 922 as the second vehicle 902 travels along the first road 908 towards the intersection 916 behind the first vehicle 900. In this example, the second vehicle 902 has a UA time 926 that is an EEBL relevant zone for both the first time 920 and second time 922 because the second vehicle 902 is always following behind the first vehicle 900 from the first time 920 to the second time 922. The time 928 of the third vehicle 904 is shown having the first time 920 and second time 922 as the third vehicle 904 travels along the driveway 912 towards the first road 908. The third vehicle 904 has a UA time 930 that is an FCW relevant zone for both the first time 920 but not the second time 922 because, in this example, the third vehicle 904 is traveling towards the first road 908 when the first vehicle 900 is approaching the driveway 912 at the first time 920. As such, at the first time 920 there is a RoC between the first vehicle 900 and the third vehicle 904 but, in this example, at the second time 922, the first vehicle 900 has passed the driveway 912 so there no longer is a RoC with the third vehicle 904. The time 932 of the fourth vehicle 906 is shown having the first time 920 and second time 922 as the fourth vehicle 906 travels along the second road 910 towards the intersection 916. The fourth vehicle 906 has a UA time 934 that is an IMA relevant zone for both the second time 922 but not the first time 920 because, in this example, the fourth vehicle 906 is traveling towards the intersection 916 and there is no chance of collision with the first vehicle 900 at the first time 920, however, once the fourth vehicle 906 approaches the intersection 916 and the first vehicle 900 passes the driveway 912 towards the intersection 916 along the first road 908 at the second time 922, the probability of an RoC between the first vehicle 900 and the fourth vehicle 906 increases.

Figure 10:
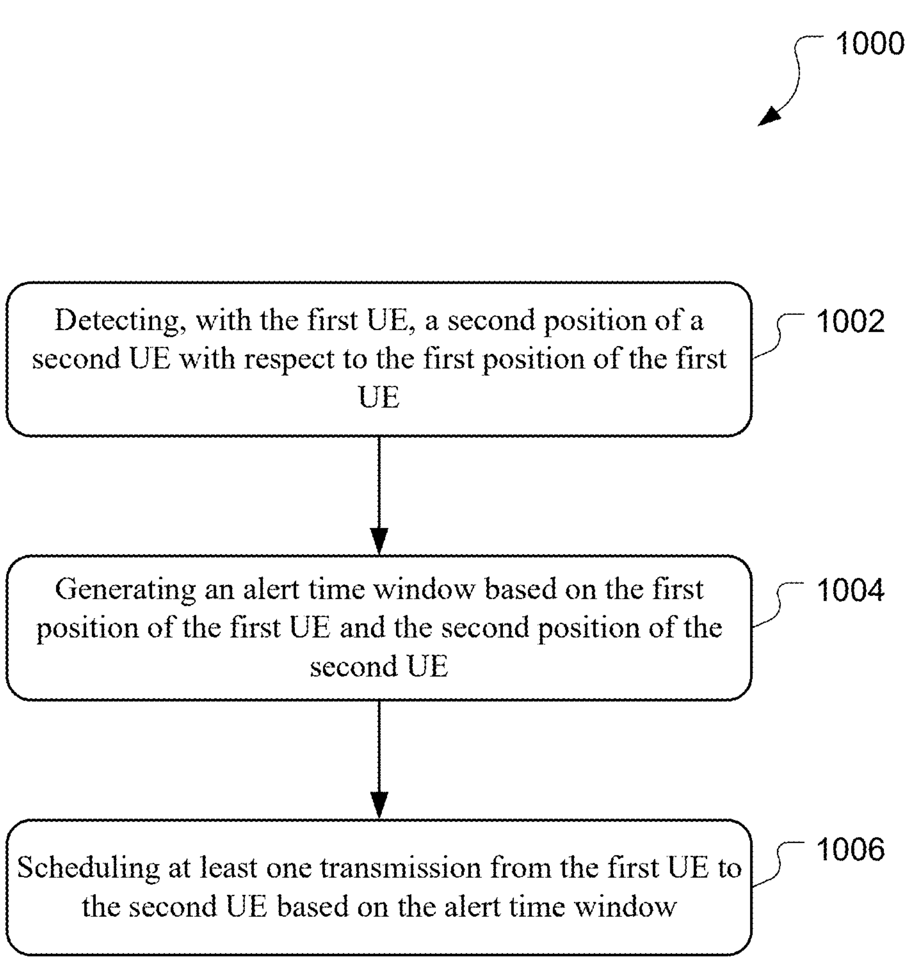
FIG. 10 is a flowchart of an example of an implementation of a method, performed by the UE shown in FIG. 5.

Turning to FIG. 10, a flowchart is shown of an example of an implementation of a method 1000, performed by the UE 500. In this example, the method 1000 may include: detecting 1002, with the first UE (i.e., UE 500), a second position 518 of a second UE (of the second vehicle 516) with respect to the first position 514 of the first UE; generating 1004 an ATW based on the first position 514 of the first UE and the second position 518 of the second UE; and scheduling 1006 at least one transmission from the first UE to the second UE based on the alert time window.

Specifically, referring to FIG. 10, at 1002, first UE (i.e., UE 500) detects a second position (i.e., second position 518) of a second UE (i.e., 2$^{nd}$ vehicle 516) with respect to a first position (i.e., 1$^{st}$ position 514) of the first UE. A means for performing the detection of 1002 may include transceiver 215 of FIG. 2 or transceiver 502 of FIG. 5, general purpose/application processor 230 of FIG. 2 or at least one processor 506 of FIG. 5, sensor(s) 213 of FIG. 2 or sensor(s) 512 of FIG. 5.

Referring to FIG. 10, at 1004, first UE generates an alert time window based on the first position of the first UE and the second position of the second UE. A means for performing the generating of 1004 may include general purpose/application processor 230 of FIG. 2 or at least one processor 506 of FIG. 5.

Referring to FIG. 10, at 1006, the first UE schedules at least one transmission from the first UE to the second UE based on the alert time window. A means for performing the generating of 1004 may include general purpose/application processor 230 of FIG. 2 or at least one processor 506 of FIG. 5.

As discussed previously with regard to the vehicle 508 of FIG. 5, this method 1000 may be performed by the at least one processor 506, where the at least one processor 506 may be configured to detect 1002 the second position 518 of the second UE by receiving information that may include the second position 518 of the second UE from at least one RSU 532, sensing the second position 518 of the second UE with at least one sensor 512, and/or information from the second UE indicating the second position 518. As an example, the at least one sensor 512 may include a camera, Lidar device, or a radar. The at least one processor 506 may also be configured to generate 1004 the ATW by determining the RoC between the first UE and the second UE as previously described based on the first position of the first UE, the second position of the second UE, a first trajectory 606 of the first UE, a second trajectory 608 of the second UE, and a probability of collision between the first UE and second UE at an intersection (i.e., point 612) of the first trajectory 606 and the second trajectory 608. Further, the at least one processor 506 may also be configured to schedule 1006 the at least one transmission by establishing a transmission schedule to maximize the probability of reception by the second UE within the ATW and/or to maximize the number of applications on the second UE.

In this example, the at least one processor 506 may also be configured to detect 1002 the second position 518 of the second UE by be configured to: track the second UE; and update the second position of the second UE to a third position of the second UE based on tracking the second UE, where generating 1004 the ATW may include determining the RoC based on the first position of the first UE and the third position of the second UE.

Implementation Examples

Implementation examples are provided in the following numbered clauses.

Clause 1. A method for vehicle-to-everything (V2X) transmission by a first user equipment (UE) at a first position, the method comprising: detecting, with the first UE, a second position of a second UE with respect to the first position of the first UE; generating an alert time window based on the first position of the first UE and the second position of the second UE; and scheduling at least one transmission from the first UE to the second UE based on the alert time window.

Clause 2. The method of clause 1, further includes transmitting to the second UE a Basic Safety Message (BSM) or a Cooperative Awareness Message (CAM).

Clause 3. The method of clause 1, wherein detecting the second position of the second UE includes receiving information selected from the group consisting of the second position of the second UE from at least one roadside unit (RSU), sensing the second position of the second UE with at least one sensor, and information from the second UE indicating the second position.

Clause 4. The method of clause 3, wherein the at least one sensor includes a camera, light detecting and ranging (Lidar) device, or a radar.

Clause 5. The method of clause 1, wherein generating the alert time window includes determining a risk of collision (RoC) between the first UE and the second UE based on the first position of the first UE, the second position of the second UE, a first trajectory of the first UE, a second trajectory of the second UE, and a probability of collision between the first UE and second UE at an intersection of the first trajectory and the second trajectory.

Clause 6. The method of clause 1, wherein scheduling the at least one transmission includes establishing a transmission schedule to maximize a probability of reception by the second UE within the alert time window.

Clause 7. The method of clause 1, wherein scheduling the at least one transmission includes establishing a transmission schedule to maximize a number of applications on the second UE.

Clause 8. The method of clause 1, wherein detecting the second position of the second UE includes: tracking the second UE; and updating the second position of the second UE to a third position of the second UE based on tracking the second UE, wherein generating the alert time window includes determining a risk of Collison (RoC) based on the first position of the first UE and the third position of the second UE.

Clause 9. The method of clause 8, further including: receiving kinematic data for the first UE; and updating the first position of the first UE to a fourth position of the first UE based on the kinematic data, wherein generating the alert time window further includes: updating the RoC based on the fourth position of the first UE and the third position of the second UE.

Clause 10. The method of clause 9, wherein scheduling the at least one transmission includes rescheduling a new transmission from the first UE to the second UE based the updated RoC.

Clause 11. A user equipment (UE) for vehicle-to-everything (V2X) transmission, wherein the UE is at a first position, the UE comprising: at least one transceiver; at least one memory; and at least one processor, coupled with the at least one transceiver and the at least one memory, the at least one processor configured to: detect a second position of a second UE with respect to the first position of the UE; generate an alert time window based on the first position of the UE and the second position of the second UE; and schedule at least one transmission from the UE to the second UE based on the alert time window.

Clause 12. The UE of clause 11, wherein the at least one processor is further configured to transmit to the second UE a Basic Safety Message (BSM) or a Cooperative Awareness Message (CAM).

Clause 13. The UE of clause 11, wherein the at least one processor is configured to detect the second position of the second UE by being configured to receive information selected from the group consisting of the second position of the second UE from at least one roadside unit (RSU), sensing the second position of the second UE with at least one sensor, and information from the second UE indicating the second position.

Clause 14. The UE of clause 13, wherein the at least one sensor includes a camera, light detecting and ranging (Lidar) device, or a radar.

Clause 15. The UE of clause 11, wherein the at least one processor is configured to generate the alert time window by being configured to determine a risk of collision (RoC) between the UE and the second UE based on the first position of the first UE, the second position of the second UE, a first trajectory of the first UE, a second trajectory of the second UE, and a probability of collision between the first UE and second UE at an intersection of the first trajectory and the second trajectory.

Clause 16. The UE of clause 11, wherein the at least one processor is configured to schedule the at least one transmission by being configured to establish a transmission schedule to maximize a probability of reception by the second UE within the alert time window.

Clause 17. The UE of clause 11, wherein the at least one processor is configured to schedule the at least one transmission by being configured to establish a transmission schedule to maximize a number of applications on the second UE.

Clause 18. The UE of clause 11, wherein the at least one processor is configured to detect a second position of the second UE by being configured to: track the second UE; and update the second position of the second UE to a third position of the second UE based on tracking the second UE;

and generate the alert time window by being configured to determine a risk of Collison (RoC) based on the first position of the UE and the third position of the second UE.

Clause 19. The UE of clause 18, wherein the at least one processor is further configured to: receive kinematic data for the UE; and update the first position of the UE to a fourth position of the UE based on the kinematic data, wherein the at least one processor is configured to generate the alert time window by further being configured to update the RoC based on the fourth position of the UE and the third position of the second UE.

Clause 20. The UE of clause 19, wherein the at least one processor is further configured reschedule a new transmission from the first UE to the second UE based the updated RoC.

Clause 21. A user equipment (UE) for vehicle-to-everything (V2X) transmission, wherein the UE is at a first position, the UE comprising: means for detecting a second position of a second UE with respect to the first position of the UE; means for generating an alert time window based on the first position of the UE and the second position of the second UE; and means for scheduling at least one transmission from the UE to the second UE based on the alert time window.

Clause 22. The UE of clause 21, further includes means for transmitting to the second UE a Basic Safety Message (BSM) or a Cooperative Awareness Message (CAM).

Clause 23. The UE of clause 21, wherein means for detecting the second position of the second UE includes means for receiving information selected from the group consisting of the second position of the second UE from at least one roadside unit (RSU), sensing the second position of the second UE with at least one sensor, and information from the second UE indicating the second position.

Clause 24. The UE of clause 23, wherein the at least one sensor includes a camera, light detecting and ranging (Lidar) device, or a radar.

Clause 25. The UE of clause 21, wherein means for generating the alert time window includes means for determining a risk of collision (RoC) between the first UE and the second UE based on the first position of the first UE, the second position of the second UE, a first trajectory of the first UE, a second trajectory of the second UE, and a probability of collision between the first UE and second UE at an intersection of the first trajectory and the second trajectory.

Clause 26. The UE of clause 21, wherein means for scheduling the at least one transmission includes means for establishing a transmission schedule to maximize a probability of reception by the second UE within the alert time window.

Clause 27. The UE of clause 21, wherein means for scheduling the at least one transmission includes means for establishing a transmission schedule to maximize a number of applications on the second UE.

Clause 28. The UE of clause 21, wherein means for detecting the second position of the second UE includes: means for tracking the second UE; and means for updating the second position of the second UE to a third position of the second UE based on tracking the second UE, wherein means for generating the alert time window includes means for determining a risk of Collison (RoC) based on the first position of the first UE and the third position of the second UE.

Clause 29. The UE of clause 28, further including: means for receiving kinematic data for the first UE; and means for updating the first position of the first UE to a fourth position of the first UE based on the kinematic data, wherein means for generating the alert time window further includes: means for updating the RoC based on the fourth position of the first UE and the third position of the second UE.

Clause 30. The UE of clause 29, wherein means for scheduling the at least one transmission includes means for determining if a Basic Safety Message (BSM), Cooperative Awareness Message (CAM), or both are scheduled to be transmitted, and further including means for rescheduling a new transmission from the first UE to the second UE based the RoC.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method for vehicle-to-everything (V2X) transmission by a first user equipment (UE), the method comprising:

detecting, with the first UE, a second trajectory associated with a second position of a second UE with respect to a first trajectory associated with a first position of the first UE;

generating an alert time window for transmission of an alert from the first UE to the second UE based on the first trajectory associated with the first position of the first UE and the second trajectory associated with the second position of the second UE, wherein the alert time window comprises an early window, a useful window, and a late window, and wherein the early window precedes the useful window in time, and the useful window precedes the late window in time; and transmitting the alert from the first UE to the second UE during the useful window of the alert time window.

2. The method of claim 1, the alert comprises a Basic Safety Message (BSM) or a Cooperative Awareness Message (CAM).

3. The method of claim 1, wherein detecting the second position of the second UE includes at least one of: (a) receiving information regarding the second position of the second UE from at least one roadside unit (RSU), (b) sensing the second position of the second UE with at least one sensor, (c) receiving information from the second UE indicating the second position, or (d) any combinations thereof.

4. The method of claim 3, wherein the at least one sensor includes a camera, light detecting and ranging (Lidar) device, or a radar.

5. The method of claim 1, wherein generating the alert time window includes determining a risk of collision (RoC) between the first UE and the second UE based on the first position of the first UE, the second position of the second UE, the first trajectory of the first UE, the second trajectory of the second UE, and a probability of collision between the first UE and second UE at an intersection of the first trajectory and the second trajectory.

6. The method of claim 1, further comprising: establishing a transmission schedule to maximize a probability of reception by the second UE within the alert time window.

7. The method of claim 1, further comprising: establishing a transmission schedule to maximize a number of applications on the second UE.

8. The method of claim 1, wherein detecting the second position of the second UE includes:

tracking the second UE; and updating the second position of the second UE to a third position of the second UE based on tracking the second UE, wherein generating the alert time window includes determining a risk of Collison (RoC) based on the first position of the first UE and the third position of the second UE.

9. The method of claim 8, further including:

receiving kinematic data for the first UE; and updating the first position of the first UE to a fourth position of the first UE based on the kinematic data, wherein generating the alert time window further includes:

updating the RoC based on the fourth position of the first UE and the third position of the second UE.

10. The method of claim 9, further including scheduling a new transmission from the first UE to the second UE based on the updated RoC.

11. A user equipment (UE) for vehicle-to-everything (V2X) transmission, wherein the UE, the UE comprising:

at least one transceiver;

at least one memory; and at least one processor, coupled with the at least one transceiver and the at least one memory, the at least one processor configured to:

detect a second trajectory associated with a second position of a second UE with respect to a first trajectory associated with a first position of the UE;

generate an alert time window for transmission of an alert from the first UE to the second UE based on the first trajectory associated with the first position of the UE and the second trajectory associated with the second position of the second UE, wherein the alert time window comprises an early window, a useful window, and a late window, and wherein the early window precedes the useful window in time, and the useful window precedes the late window in time; and transmit an alert from the first UE to the second UE during the useful window of the alert time window.

12. The UE of claim 11, wherein the alert comprises a Basic Safety Message (BSM), a Cooperative Awareness Message (CAM), or both.

13. The UE of claim 12, wherein the at least one processor is further configured to detect the second position of the second UE by being configured to at least one of: (a) receive information regarding the second position of the second UE from at least one roadside unit (RSU), (b) sense the second position of the second UE with at least one sensor, (c) receive information from the second UE indicating the second position, or (d) any combinations thereof.

14. The UE of claim 11, wherein the at least one processor is configured to generate the alert time window by being configured to determine a risk of collision (RoC) between the UE and the second UE based on the first position of the first UE, the second position of the second UE, the first trajectory of the first UE, the second trajectory of the second UE, and a probability of collision between the first UE and second UE at an intersection of the first trajectory and the second trajectory.

15. The UE of claim 11, wherein the at least one processor is configured to establish a transmission schedule to maximize a probability of reception by the second UE within the alert time window.

16. The UE of claim 11, wherein the at least one processor is configured to establish a transmission schedule to maximize a number of applications on the second UE.

17. The UE of claim 11, wherein the at least one processor is configured to:

detect a second position of the second UE by being configured to:

track the second UE; and update the second position of the second UE to a third position of the second UE based on tracking the second UE; and generate the alert time window by being configured to determine a risk of Collison (RoC) based on the first position of the UE and the third position of the second UE.

18. The UE of claim 17, wherein the at least one processor is further configured to:

receive kinematic data for the UE; and update the first position of the UE to a fourth position of the UE based on the kinematic data, wherein the at least one processor is configured to generate the alert time window by further being configured to update the RoC based on the fourth position of the UE and the third position of the second UE.

19. The UE of claim 18, wherein the at least one processor is configured to schedule a new transmission from the first UE to the second UE based on the updated RoC.

20. A user equipment (UE) for vehicle-to-everything (V2X) transmission, wherein the UE, the UE comprising:

means for detecting a second trajectory of a second position of a second UE with respect to a first trajectory of a first position of the UE;

means for generating an alert time window for transmission of an alert from the first UE to the second UE based on the first trajectory of the first position of the UE and the second trajectory of the second position of the second UE, wherein the alert time window comprises an early window, a useful window, and a late window, and wherein the early window precedes the useful window in time, and the useful window precedes the late window in time; and means for transmitting an alert from the UE to the second UE during the useful window of the alert time window.

* * * * *